No. 675,987. Patented June 11, 1901.
J. W. TALLMADGE.
ACETYLENE GAS GENERATOR.
(Application filed Dec. 31, 1900.)
(No Model.) 3 Sheets—Sheet 1.

WITNESSES. INVENTOR.

No. 675,987. Patented June 11, 1901.
J. W. TALLMADGE.
ACETYLENE GAS GENERATOR.
(Application filed Dec. 31, 1900.)
(No Model.) 3 Sheets—Sheet 2.

WITNESSES. INVENTOR.
H. Harrington James W. Tallmadge
Arthur A. Shafter

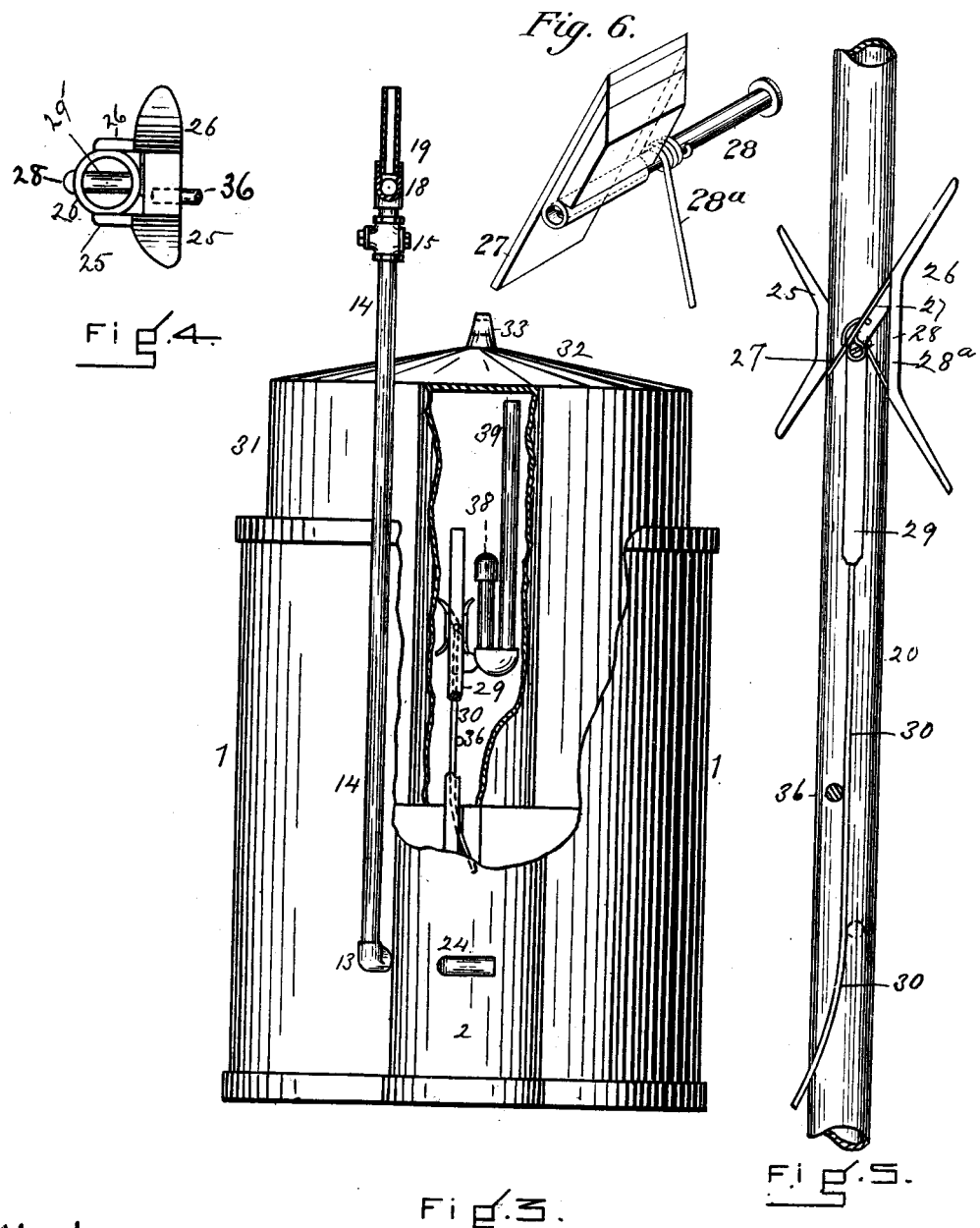

UNITED STATES PATENT OFFICE.

JAMES W. TALLMADGE, OF BOSTON, MASSACHUSETTS.

ACETYLENE-GAS GENERATOR.

SPECIFICATION forming part of Letters Patent No. 675,987, dated June 11, 1901.

Application filed December 31, 1900. Serial No. 41,741. (No model.)

*To all whom it may concern:*

Be it known that I, JAMES W. TALLMADGE, a citizen of the United States, residing in Boston, in the county of Suffolk and State of Massachusetts, have invented new and useful Improvements in Acetylene-Gas Apparatus, of which the following is a specification.

This invention relates to apparatus for the manufacture of acetylene gas by submerging calcium carbid in water, the supply of carbid thereto being automatically controlled by the pressure of the gas generated when and as required for consumption, and the invention or improvement performs important functions employing no mechanical movements, while its minimized simplicity overcomes great objections incident to the use of such apparatus as heretofore constructed. It is recharged without interfering with the gas-supply, without removing any water or mechanical parts, and without handling calcium carbid or its residuum. I accomplish this object by means of the mechanism illustrated in the accompanying drawings, in which—

Figure 1:
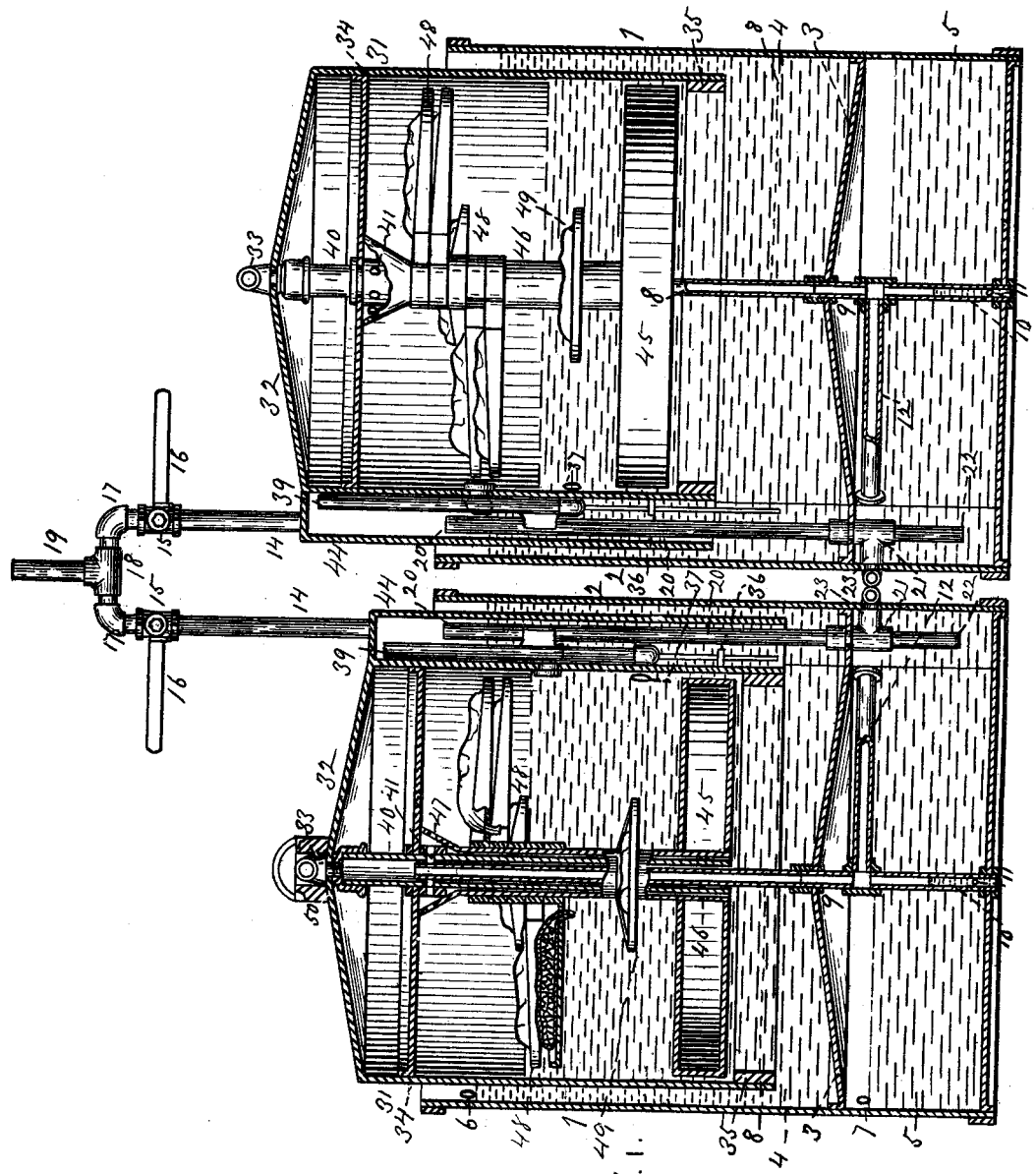
Figure 2:
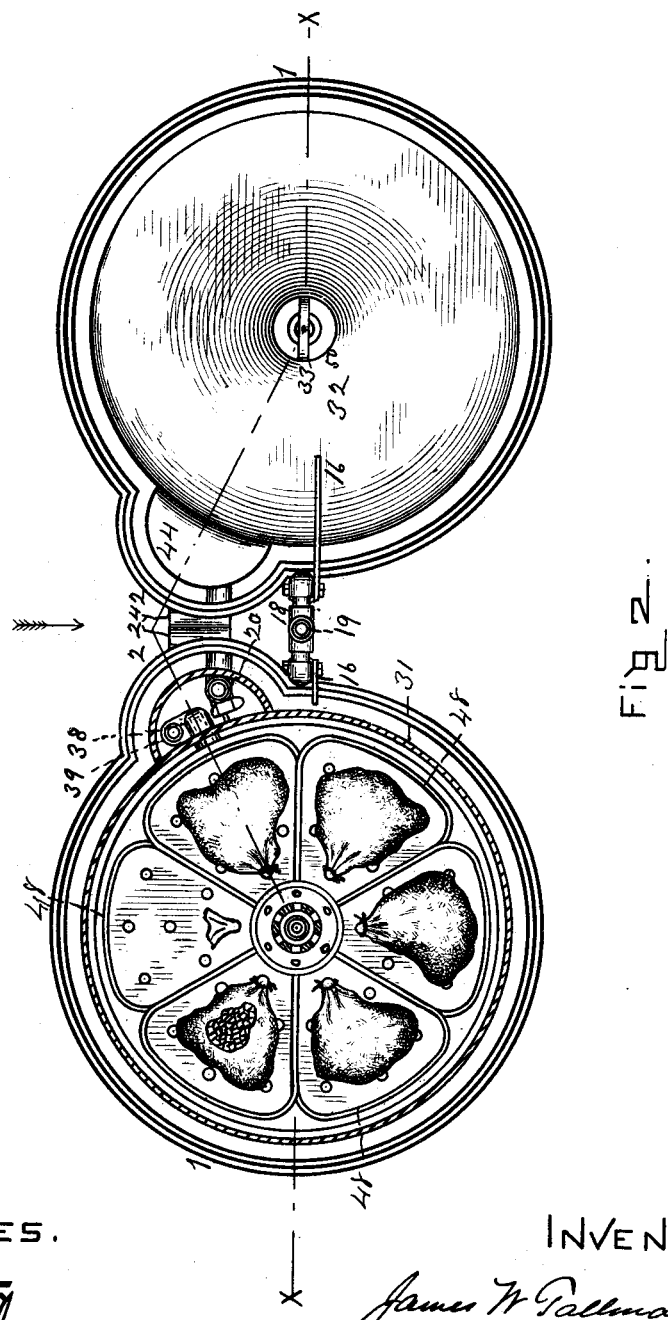

Figure 1 is a view in vertical section taken on line $x$, Fig. 2. Fig. 2 is a view, partly in plan and partly in horizontal section. Fig. 3 is a view in elevation of one of the tanks separated from the other looking from a point between the tanks. Portions are represented as having been broken out. Fig. 4 is a plan view of the locking contrivance. Fig. 5 is an elevation of the same looking from within the tank and toward the other tank. Fig. 6 is a view in perspective of the same.

Similar characters of reference indicate corresponding parts.

The two tanks, with their contents, are exactly alike. Hence reference characters refer to corresponding parts in both.

1 represents a metallic receptacle cylindrical in form, except being provided with a projecting segment 2, open at the top and closed at the bottom, which is divided by means of a conical transverse partition 3 into an upper tank-compartment 4 and a lower condenser-compartment 5, said compartments 4 and 5 being provided near their tops with overflow-holes 6 and 7, respectively. An open-ended gas-eduction pipe 8 extends from the apex center of the compartment 4 down through and is affixed to the partition 3 and is provided with a T 9 at its lower end. A trap-nipple 10, provided with a hole 11 near its lower end, extends from the T down through and is affixed to the bottom of the condenser 5, being closed at its outer lower end by a suitable cap. Close beneath the partition 3 a horizontal gas-pipe 12 connects with the side outlet of the T 9 and extends through and is affixed to the side of the condenser near its junction with the segment 2 and is provided with an upturned elbow 13, Fig. 3, on the outside of the receptacle 1. A vertical gas-pipe 14, connected with the upturned end of the elbow, extends for a suitable distance above the receptacle 1, where it is provided with a cock 15, having a lever 16, Fig. 1. Connected to the upper outlet of the cock 15 is an elbow 17, whose outlet is turned from the receptacle. The twin receptacles are here connected by nipples and an intervening T 18, its side outlet being for connection to the service-pipe 19. An open-ended blow-off pipe 20 is located in the segment of the receptacle 1 and extends from near its top down through and is affixed to partition 3. This pipe is provided with a T 21, connecting with a trap-nipple 22 and extends downward to near the bottom of the segment. Close beneath the partition 3 a horizontal nipple 23, connected to the side outlet of the T 21, extends through and is affixed to the side of the segment 2 and connects with an elbow 24 on the outside of the segment, to which elbow a pipe may be connected extending to the outside atmosphere.

Rigidly secured to the blow-off pipe 20, near its upper end, (see Figs. 4 and 5,) are a pair of lugs 25 and 26, each of which consists of a vertical central portion and upper and lower portions extending outwardly from said central portion at angles of about twenty-two and one-half degrees, as shown. Between these lugs a spring-latch is located, (see Fig. 6,) said latch consisting of a pawl 27, provided with pin 28, extending loosely through a sleeve 29', which is affixed horizontally through the pipe 20. This latch extends normally from one lug to the other, (but is not secured to either,) and thus closes the vertical passage between said lugs, being held in such position by a suitable spring $28^a$. A bracket 29, independent of the pawl and the lugs, is rigidly secured to the pipe 20, and a rod 30, having a flexible curved lower end, extends downward from said bracket. A spring 28$^a$, Figs. 4, 5, and 6, is secured to the pin 28 and extends down and bears against the inner surface of the lug 26. As the pawl 27 is rigid on the pin 28, the said spring holds the upper end of said pawl normally against the inner surface of the lug 26 and the lower end against the inner surface of the lug 25.

31 represents a metallic bell cylindrical in form and provided with the conical top 32, having affixed at its apex an eye 33. This bell is also provided with the transverse partition 34 a short distance below the top 32 and a hoop 35, (for weight,) affixed around inside its open bottom; also, a pin 36, blow-off hole 37, and a trap, Fig. 3, which trap consists of a vertical U-shaped pipe, its short leg 38 extending through and being affixed to the side of the bell 31, just below the bottom of the level of the second lowest carbid-pan, and its long leg 39 extending nearly to the top of the bell. The pipe 40, closed at its upper end, extends from the eye 33 of the bell 31, through and is affixed to the conical top 32 and transverse partition 34, to near the bottom of the bell, said pipe 40 being provided with holes 41 close beneath the partition 34.

A vertical segment 44, inclosing the pin 36, blow-off hole 37, and trap 38 39, is affixed to the outside of and extends the length of the bell, thus forming a crescent-shaped telescopic compartment open at the bottom and closed at the top.

45 represents a metallic float cylindrical in form, closed at top and bottom, and provided with a vertical open-ended telescopic pipe 46, which passes rigidly through the center of and extends from the bottom of to some distance above the top of the float, where it is funnel-shaped and provided with holes 47. Above the float 45 and affixed spirally around the telescopical pipe 46 are sector-shaped perforated carbid-pans 48 and 49.

50 represents a weight.

In the use of this apparatus the twin tanks are placed in the desired position, a horizontal bar is affixed above them, from which a fall and tackle is suspended, (so that its lift may be shifted to a plumb above the center of either tank,) and the proper pipe connections, as hereinbefore referred to, are made. Water is then introduced through the gas-eduction pipes 8 and fed into lower compartments 5 in quantity to rise to a plane just below the overflow-holes 7. Then the upper compartments are partially filled with water sufficient in quantity to rise to a plane just below the overflow-holes 6, when the floats 45 and bells 31 are normally disposed therein. The floats are placed in their respective tanks and rest upon the water therein, with the lower portion of their telescopical pipes 46 loosely surrounding the gas-eduction pipes.

Before the bells can be placed in (or removed from) their normal positions in their respective tanks it is necessary that the levers 16 should be in a vertical position, which insures closing of the cocks 15 and the cutting off of gas connection between the twins.

The fall and tackle hereinbefore mentioned is attached to the eye 33 of one of the bells, which by this means is suspended above its respective tank. The requisite number of previously-prepared bags of carbid is placed on the pans 48 49 and the bell is lowered into the tank. As the bell descends its telescopical pipe 40 passes between the telescopical pipe 46 of the float and the gas-eduction pipe 8 of the tank, and its vertical segment 44 passes into the projecting segment 2 of the tank. After the lower end of the bell intersects the water in the tank the fall and tackle is detached from the eye and the transverse partition 34 comes in contact with the funnel end of the telescopical pipe 46, and the float is immersed, and thereafter its vertical movement is controlled by and is identical with the movement of the bell, constituting a regulator, which governs the pressure of gas, the requisite pressure being obtained by the weight of the ring 35 and demonstrated by the surface of the water in the bell being lower than the surface of the water in the tank, also by the surface of the water in the trap-nipples 10 and 22 being lower than the surface of the water in the condenser-compartment. The end of the pin 36 in the crescent-shaped compartment of the bell extending toward the blow-off pipe 20 in the segment of the tank passes between and is guided by the lugs 25 and 26 and slips past the lower end of pawl 27. As this end of the pawl 27 is held against the lug 25 and as the pin 36 is prevented by the bracket 29 from slipping under that portion of the pawl 27 which is against the lug 26, the pin is prevented from ascending higher than the pivot 28 or throat of the pawl, as the passage between the bracket 29 and the lug 25 is held closed by the action of the spring 28$^a$ upon the pivot 28, to which the pawl 27 is rigidly secured. Hence the lower end of the bell is prevented from ascending or being lifted above the surface of the water in the tank until after all carbid therein has been slaked and its gas consumed, thereby allowing the bell to descend to its lowest position and carrying the pin 36 below the curved flexible end of the rod 30, thus allowing said rod to snap past the pin. As the bell gradually descends the air contained therein passes out through the blow-off hole 37 and trap 38 39 into the vertical segment 44, which in turn delivers said air to the outside atmosphere by means of the blow-off pipe 20, T 21, (at this point all condensation passes down the trap-nipple 22 into the condenser,) elbow 24, and suitable pipe connections. As the bell continues to descend, the blow-off hole 37 first becomes submerged, and its function ceases for the time being. Next the lower pan 49 and the carbid thereon disposed are submerged and gas is generated, which checks the descent of the bell, and the gas thus formed impregnates the remaining air in the bell and escapes by way of the trap until the carbid on the lower pan ceases to generate gas sufficiently to retard the descent of the bell, after which the bell will gradually descend until water flows into and chokes the trap. The lever 16 is then moved to a horizontal position, projecting over the top of the bell, which movement opens the cock 15 and permits gas to enter the service-pipe 19. If no gas is being consumed, the bell will ascend slowly until all unslacked carbid contained therein is above the water. Then the formation of gas ceases and the bell remains stationary. In case of over production of gas at any time the bell will ascend only until the blow-off hole is partly above surface of the water within the bell. Then the surplus gas will escape therefrom by the same way the air does, as hereinbefore described. The twin machines being both assembled and charged alike, gas has free passage from one to the other, as well as to the survice-pipe. The gas to be consumed passes from the bells to the survice-pipe by way of the holes 47 in the funnel end of the telescopical pipe 46, holes 41 close beneath the partition 34 in the vertical pipe of the bell, gas-eduction pipe 8, (at this point all condensation passes down the trap-nipple 10 into the condenser,) horizontal gas-pipe 12, vertical gas-pipe 14 outside of and extending above the tank, and the cock 15. The weight 50 is placed upon one of the bells covering its eye 33. When gas is being consumed, this bell descends, and as much of the carbid on the different pans comes successively in contact with the water as is required to generate gas enough to supply the consumption. When no gas is being consumed, the gas generated from carbid which was being operated on at the time consumption ceased lifts the bell, taking the carbid out of the water, the generation of gas ceases, and the bell remains stationary. The extra pressure caused by the weight 50 holds the other twin bell in check until the weighted bell descends to its lowest point and all carbid therein has been slaked and its gas consumed. The extra pressure is then relaxed and the other twin bell comes into action automatically. The exhausted twin may then be recharged by first lifting the lever 16 to a vertical position, which closes the cock 15 and prevents backflow of gas and also allows the bell to pass the lever. Next the weight 50 is removed and placed upon the bell of the other twin machine. Then the bell of the exhausted machine is lifted by means of a fall and tackle. In this operation air is sucked into said bell, (through the same course by which air was extracted,) thus freeing the trap of water and relieving the vacuum-suction. The curved end of the rod 30 having previously snapped past the pin 36, as hereinbefore described, said pin is permitted to ascend and slip past the upper end of the pawl 27, allowing the bell to be hoisted entirely out of its tank and suspended above the same, leaving its float resting upon the surface of the water within the exhausted tank and holding the carbid-pans above the top of said tank, so that the bags now containing residuum may be removed and replaced by others containing carbid. Then the bell is lowered into its tank, as hereinbefore described, and the operation of the bells is reversed.

Having thus fully described my invention, what I claim, and desire to secure by Letters Patent, is—

1. In an apparatus of the character described for the manufacture of acetylene gas, a pair of twin tanks each complete in itself and provided with a vertical segment as 2; a pair of bells each provided with a vertical segment as 44; the open-ended blow-off pipes 20 located in said segments; connections from the gas-space inside the bells to said pipes 20; said pipes 20 being also provided with connections leading to the outside air, substantially as and for the purpose described.

2. In an apparatus of the character described for the manufacture of acetylene gas, comprising a pair of twin tanks each complete in itself and provided with a vertical segment as 2, the combination with said tanks of the bells 31 provided with the vertical segments 44, the blow-off holes 37 and traps 38, 39, and blow-off pipes disposed in said segments 2, substantially as set forth.

3. In an apparatus of the character described for the manufacture of acetylene gas, comprising a pair of twin tanks provided with vertical segments as 2, and a pair of bells provided with vertical segments as 44 intermeshing the said segments 2, said bells being provided with holes communicating with the segments 44, the blow-off pipes 20 supported by the tanks and arranged vertically in the segments 2; the oppositely-disposed lugs 25 and 26 supported by the pipes; the latches supported by the pipes between said lugs extending diagonally from one to the other and held normally in position by suitable springs; the rods 30 secured to the pipes extending downward substantially parallel therewith and with their lower ends slightly curved, and horizontal pins extending outward from the bells, all arranged substantially as and for the purpose described.

4. In an apparatus of the character described for the manufacture of acetylene gas, the tank provided with a suitable blow-off compartment, formed with the vertical projecting segment 2; the bell formed with the vertical projecting segment 44 meshing into said segment 2 and adapted to rise and fall therein as the bell rises and falls in the tank;

the blow-off pipe 20 supported vertically within the two segments, and sustained by the tank; and a pipe leading from the blow-off pipe and opening into the outside atmosphere, said blow-off pipe being open at its opposite ends into the tank-segment and the bell-segment respectively, substantially as set forth.

5. In an acetylene-generator the combination of a water-tank provided with a bell and a gas-eduction pipe, of carbid-holding means disposed about and guided by said gas-pipe, said means being provided with a float and being entirely disconnected from said bell, substantially as described.

6. In an acetylene-generator provided with a water-tank, a bell and a gas-eduction pipe; the combination of the open-ended pipe 46 loosely disposed about said gas-eduction pipe 40 and being provided with a float 45 and carbid-holding means, substantially as described.

7. In an acetylene-generator provided with a water-tank, a bell and a gas-pipe disposed in said tank, the combination of the pipes 40 and 46 respectively disposed about said gas-pipe, the pipe 40 having gas-outlet perforations and being attached to the gas-bell and the pipe 46 being entirely disconnected from said bell and provided with a float and carbid-holding means, substantially as described.

8. In an acetylene-generator provided with a water-tank a bell and a gas-eduction pipe, the combination of the pipes 40 and 46 respectively disposed about said gas-eduction pipe, the pipe 40 having gas-outlet perforations and being attached to the gas-bell and the pipe 46 being entirely disconnected from said bell and provided with a float, carbid-holding means and a flared and perforated upper end, substantially as described.

9. In an acetylene-generator the combination of a water-tank, a centrally-disposed gas-outlet pipe in said tank, a bell provided with the partition 34 and the perforated pipe 40, said pipe 40 being disposed about said gas-outlet pipe, of carbid-supporting means provided with a float disposed in said tank, said means being adapted to be held against said partition 34 when the generator is in operation, substantially as described.

JAMES W. TALLMADGE.

Witnesses:
ARTHUR A. SHAFTER,
H. HARRINGTON.